(12) United States Patent
Bouzon (10) Patent No.: US 8,107,583 B2
(45) Date of Patent: Jan. 31, 2012

(54) SEALING MEANS, TRANSFER DEVICE COMPRISING SUCH A SEALING MEANS, ARRANGEMENT COMPRISING SUCH A TRANSFER DEVICE AND A METHOD FOR PRODUCING SAID SEALING MEANS

(75) Inventor: Pierre Bouzon, Saint Remy les Chevreuse (FR)

(73) Assignee: Areva NC, Paris (FR)

( * ) Notice: Subject to any disclaimer, the term of this patent is extended or adjusted under 35 U.S.C. 154(b) by 352 days.

(21) Appl. No.: 11/992,688

(22) PCT Filed: Sep. 25, 2006

(86) PCT No.: PCT/EP2006/066710
§ 371 (c)(1),
(2), (4) Date: Mar. 26, 2008

(87) PCT Pub. No.: WO2007/036507
PCT Pub. Date: Apr. 5, 2007

(65) Prior Publication Data
US 2010/0054388 A1    Mar. 4, 2010

(30) Foreign Application Priority Data
Sep. 28, 2005  (FR) ...................................... 05 52938

(51) Int. Cl.
*G21C 13/00*  (2006.01)
(52) U.S. Cl. ...................... 376/203; 376/260; 250/505.1
(58) Field of Classification Search .................. 376/203, 376/260; 250/505.1
See application file for complete search history.

(56) References Cited

U.S. PATENT DOCUMENTS

| | | | | |
|---|---|---|---|---|
| 1,991,050 A | * | 2/1935 | Clausen | 414/149 |
| 1,992,847 A | * | 2/1935 | Uhrich | 49/45 |
| 4,077,389 A | | 3/1978 | Vogel | |
| 4,221,039 A | | 9/1980 | Smith | |
| 4,785,580 A | * | 11/1988 | Olesen | 49/44 |
| 5,740,221 A | * | 4/1998 | Norman et al. | 378/58 |
| 5,984,318 A | | 11/1999 | Kojima et al. | |
| 6,367,198 B1 | * | 4/2002 | Rockenbach | 49/42 |
| 6,479,580 B1 | * | 11/2002 | Chorvath et al. | 524/588 |
| 7,274,026 B2 | * | 9/2007 | Bol et al. | 250/453.11 |

FOREIGN PATENT DOCUMENTS

| | | |
|---|---|---|
| DE | 2921752 | 1/1980 |
| EP | 0837277 A2 | 4/1998 |
| FR | 1364102 | 3/1963 |
| FR | 2712656 | 5/1995 |
| GB | 993629 * | 6/1965 |
| GB | 1015342 | 12/1965 |
| WO | WO2004001172 * | 12/2003 |
| WO | 2006/046938 A1 | 5/2006 |

OTHER PUBLICATIONS

International Preliminary Report, Application No. PCT/EP2006/066710, dated Sep. 12, 2008.

* cited by examiner

*Primary Examiner* — Ricardo Palabrica
(74) *Attorney, Agent, or Firm* — Nixon Peabody LLP (57) ABSTRACT

Sealing means comprising a seal carrier and a seal connected thereto, wherein the seal carrier is removably fixable between two areas insulated from each other, and a transfer device between two chambers, which are separated by a wall, wherein said transfer device comprises a transfer mechanism and at least one sealing means according to the invention which is positioned between the wall and the transfer mechanism.

15 Claims, 6 Drawing Sheets

SEALING MEANS, TRANSFER DEVICE COMPRISING SUCH A SEALING MEANS, ARRANGEMENT COMPRISING SUCH A TRANSFER DEVICE AND A METHOD FOR PRODUCING SAID SEALING MEANS

CROSS REFERENCE TO RELATED APPLICATIONS OR PRIORITY CLAIM

This application is a national phase of International Application No. PCT/EP2006/066710 entitled "Sealing Means, Transfer Device Comprising Such a Sealing Means, Arrangement Comprising Such a Transfer Device and a Method for Producing Said Sealing Means", which was filed on Sep. 25, 2006, and which claims priority of French Patent Application No. 05 52938, filed Sep. 28, 2005.

TECHNICAL FIELD AND PRIOR ART

This invention mainly concerns a sealing means, in particular between two radioactive environments, a transfer device in a nuclear fuel production plant comprising means of tight insulation, a production plant comprising such a device and a method for producing such a sealing means.

It is known, for example in document FR-1364102, a revolving or barrel door to transfer a radioactive object from one enclosed area to another, with the door providing when operating and when at rest, a tight seal between the two spaces. The seal is obtained thanks to an inflatable seal mounted on a wall partially surrounding the drum.

The sealing means must resist hot gases and flames in the event of fire, in order to limit the propagation of contaminated gases and flames.

However, the seals that are currently in use which are fixed on the door, or on the wall separating the two confined areas, do not ensure sufficient resistance to hot gases and flames or a tight seal against contamination during a long period. In addition these seals are fragile and quickly become brittle since they are solicited with each rotation of the barrel door.

Thus major problems appear in terms of maintaining this type of transfer device, which can cause stoppages of installations for a long duration.

It is consequently a purpose of this invention to provide a sealing means that offers the guarantees of safety that are required for this type of device.

It is also a purpose of this invention to provide a transfer device that can operate in conditions that are safe for the environment and for people working in this type of installation.

It is also a purpose of this invention to offer a method for producing said sealing means.

DESCRIPTION OF THE INVENTION

The previously mentioned purposes are attained by a means making it possible to tightly insulate two chambers, formed by a seal and a seal carrier, with the seal able to insulate flames and hot gases and is sufficiently resistant to radiation to be suitable for such devices. The seal carrier is easily removable, thus making it possible to replace the seal easily when the latter shows signs of deterioration.

By seal is meant the property of confining for a determined length of time flames and hot gases in a first chamber in order to avoid them passing into a second chamber.

Thus, it is not necessary to have a seal that is resistant to flames, hot gases and radiation over a long period of time, since the latter can be changed quickly and easily. This replacement does not impose a prolonged stoppage of the device.

The subject-matter of the present invention is mainly a sealing means for a transfer device of a nuclear installation comprising a seal carrier and a seal connected thereto, wherein the seal carrier is removably fixable between two areas insulated from each other.

The seal carrier comprises for example a T groove receiving the seal. Advantageously, the seal carrier is made of stainless steel.

The seal is made of a material that resists flames, hot gases and radiation, and advantageously intumescent material.

In an embodiment, the seal carrier is made of several parts, for example three parts.

The invention also relates to a transfer device of a nuclear installation between two chambers separated by a wall, wherein said transfer device comprises a transfer mechanism and at least one sealing means according to the invention, said sealing means being positioned between the wall and the transfer mechanism.

Furthermore, the seal carrier and the seal are arranged substantially along the wall according to a generatrix of a cylinder forming the outer periphery of the transfer mechanism.

In an embodiment, the transfer mechanism is of the barrel door type mobile around an axis, comprising a cylindrical body defining an inner space wherein an object can be positioned, with this space being accessible by an opening that can be oriented either on the side of a first chamber or on the side of a second chamber.

Advantageously, the transfer device according to the invention comprises a first pressure drop means able to increase the travel of the gases between the chambers, said first means being mounted on an upper end of the door substantially according to a plane orthogonal to the axis of rotation of the door.

The first pressure drop means is, for example, formed by a steel angle assembly and, advantageously, by several arcs of a circle placed end to end.

The transfer device can also comprise a second pressure drop means positioned along a generatrix of the outer periphery of the transfer mechanism. This second means comprises for example an elongated element made of steel, with a substantially circular transversal section.

In an embodiment, the door comprises a first axis projecting from an upper side and a second axis projecting from a lower side around which the door is able to rotate. The door can be driven in rotation by an electric motor.

The subject-matter of the present invention is also a production or treatment installation, for example of nuclear fuel, for example of the MOX-type (mixture of uranium oxide and plutonium oxide) comprising a main chamber and at least one secondary chamber separated by the wall, an opening for communication between the chambers arranged in the wall, a transfer device according to the invention, insulating the chambers.

The seal carrier is fixed by screw-bolt connection on the wall separating the two chambers.

The production installation according to the invention can comprise a first curved recess with inner radius substantially equal to the outer radius of the door and receiving a portion of this door.

The second pressure drop means is for example welded in a groove defined by the wall and a safety caisson defining the first recess, a second curved recess surrounding the door, over approximately 180°.

The subject-matter of the present invention is also a method of producing the sealing means according to the invention, comprising the steps:

installing shutters on the longitudinal and transversal ends of the groove of the seal carrier,
    injecting a flame- and hot gas-resistant material into the groove,
    removing shutters.

BRIEF DESCRIPTION OF THE DRAWINGS

This invention shall be better understood using the description that follows and the annexed figures wherein.

DETAILED DESCRIPTION OF SPECIAL EMBODIMENTS

In the description that follows, the invention is applied to a nuclear fuel production installation, but it also applies to an installation that uses said fuel or that treats it.

Furthermore, the transfer device according to the invention can be used in any installation requiring a transfer between two areas between which a tight seal is expected.

Figure 9:
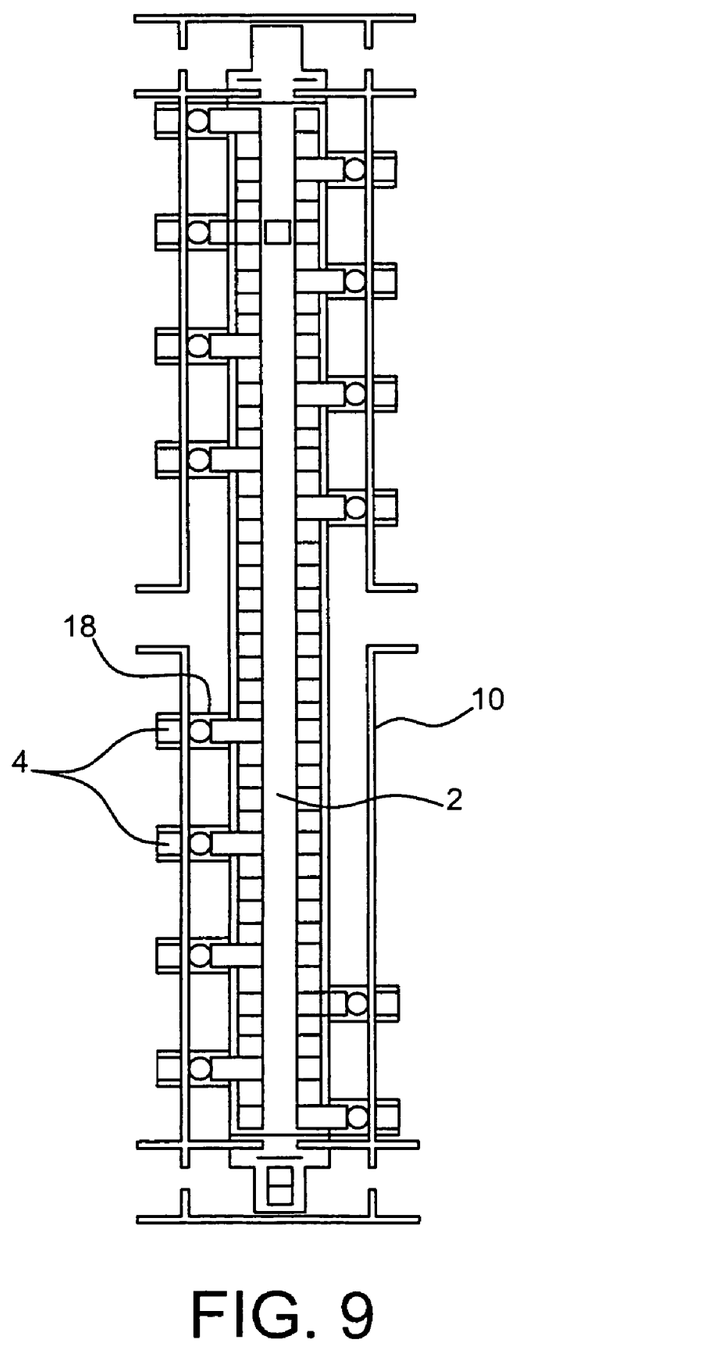
FIG. 9 is a schematic top view of a nuclear fuel production workshop implementing the transfer devices according to the invention.

In FIG. 9, a workshop is shown schematically wherein a nuclear fuel is produced. This workshop comprises a main chamber 2 equipped for example with a means of transporting or conveying materials intended for the production of the nuclear fuel, and secondary chambers 4 wherein the different operations of transforming the basic materials of the nuclear fuel are executed. The basic operations are for example the proportioning of the primary mixture, milling, the proportioning of the final mixture, homogenisation, granulation and the production of nuclear fuel pellets which will then be placed in ducts in order to form fuel rods.

The main chamber 2 has the shape of a rectangular corridor and the secondary chambers 4 are distributed on either side of the main chamber 2. Openings 18 allow for communication between chamber 2 and chambers 4.

In order to provide maximum protection in use and in operation, the main chamber 2 and the secondary chambers 4 are insulated from each other in order to reduce the risk of propagation of flames and hot gases in the event of fire in one of the chambers. However, in order to allow for the transfer of the materials between the secondary chambers by the intermediary of the main chamber 2, transfer devices 6 are disposed between the main chamber 2 and the secondary chambers 4, at openings 18.

Figure 1:
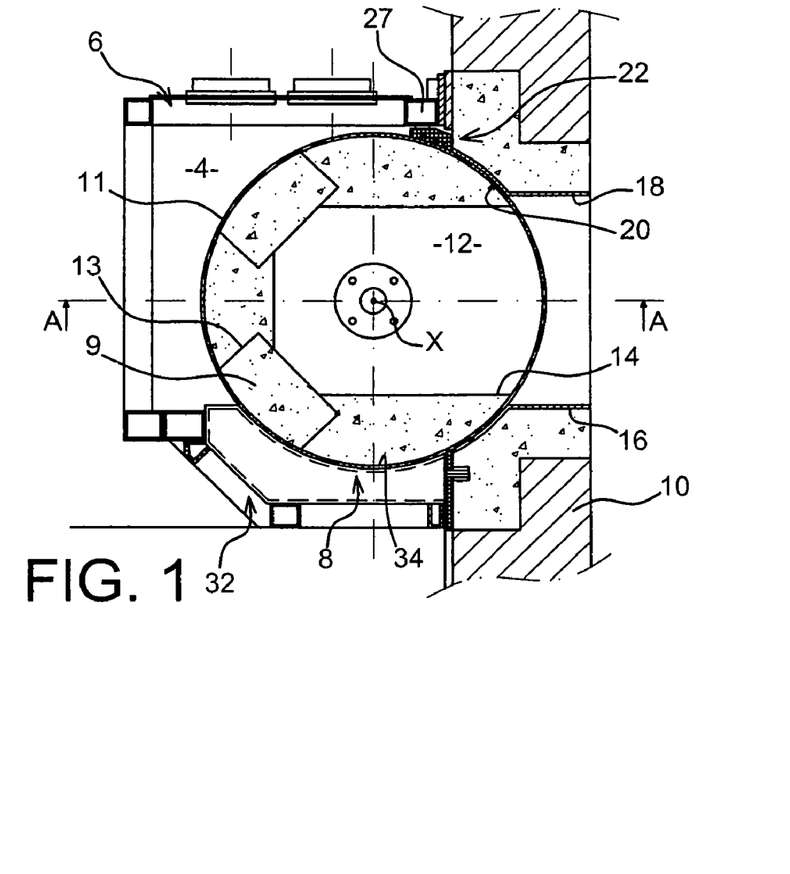
FIG. 1 is a transversal cross-section of a transfer device according to the invention.

In FIG. 1, this transfer device can be seen, comprising a barrel door 8 rotatable about the axis X of rotation and making it possible to transfer objects from the main chamber 2 to secondary chambers 4 and vice versa. The main chamber 2 is separated from secondary chambers 4 by an insulation wall 10.

Since all of the transfer devices of the installation are substantially the same, only a transfer device 6 and a secondary chamber 4 will be described.

The barrel door 8 substantially has the form of a regular cylinder, defining an inner space 12, communicating with the outside via an opening 14 that is substantially rectangular in the example shown.

The barrel door 8 comprises a body 9 formed, for example, of a jacket 11 made of stainless steel filled with a material comprising cast iron and binders of the resin type, such as MP2.

The jacket comprises, advantageously arms penetrating into the fill material in such a way as to ensure proper fixation of the shell 11 in the material.

The wall 10 is made from, for example, concrete and covered with a shielding 16 in such a way as to form a fire-proof seal. The opening 18 is of substantially likewise dimension as that of opening 14 arranged in barrel door 8, in such a way that when the opening 14 of the barrel door is facing the opening 18 of the wall, openings 14 and 18 match up.

The wall 10 comprises a recess 20 defined by a curved surface, with an inner radius that is substantially equal to the outer radius of barrel door 8, and receiving a portion of said barrel door 8. The barrel door penetrates into wall 10 and sealing means 22 are provided between the cylindrical periphery of the door and the curved surface of wall 10, in such a way as to provide a seal between the barrel door and the wall, and thus between the main chamber 2 and the secondary chamber 4.

A sealing means 22 according to the invention is positioned along a generatrix (FIG. 1) of the cylindrical body 9 in such a way that it is in contact with the outer periphery of barrel door 8. Means 22 is, for example fixed to the wall 10, in particular to an end of the curved recess 20.

Figure 3:
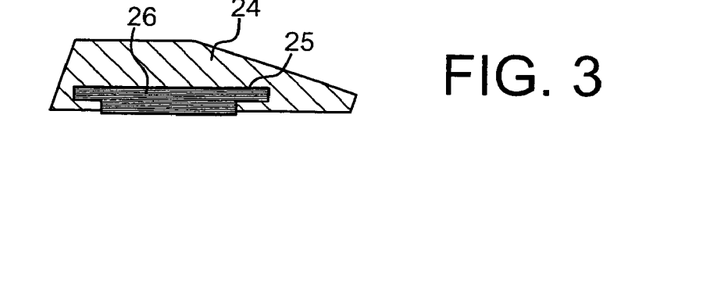
FIG. 3 is an enlarged detailed view of FIG. 1.
Figure 4:
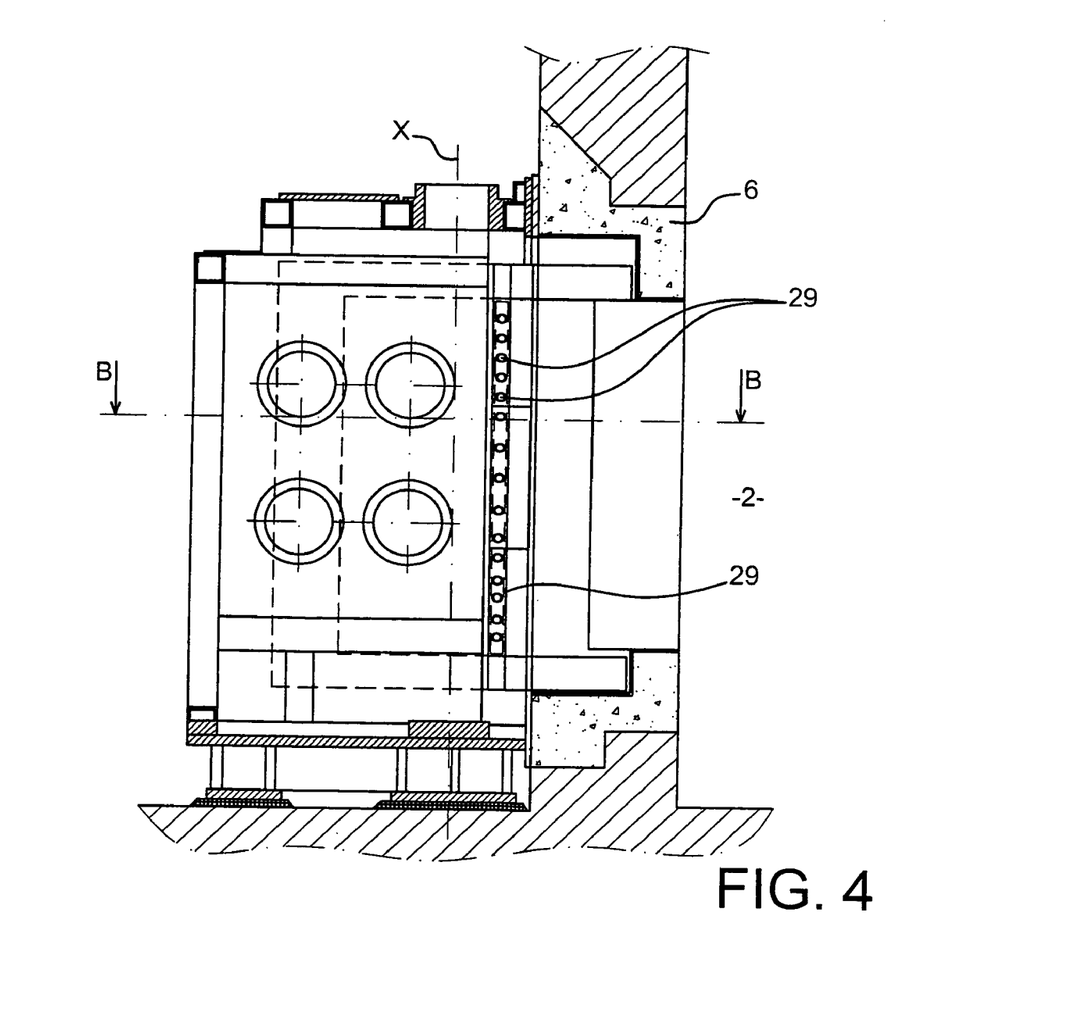
FIG. 4 is a cross-section of a seal carrier and of a seal according to this invention.

This sealing means 22 comprises, according to this invention and as shown in FIGS. 3 and 4, a seal carrier 24 and a seal 26, with seal carrier 24 being fixed on the wall 10, and the seal being in contact with the outer periphery of barrel door 8.

The seal carrier 24 has a substantially trapezoidal form, with the large base comprising a groove 25 wherein is placed seal 26. The particular form of the seal carrier ensures guidance for the mounting of the seal carrier, facilitating its accurate installation and the alignment of the seal with the outside cylindrical wall of the barrel door.

The groove 25 advantageously has a T-shaped section in order to improve the holding of the seal 26.

Advantageously, the seal carrier is provided with a handgrip handle 31 for the installation and mounting of the seal carrier on the wall 10 and the element 27. This handle 31 can be removable, it is used to mount the seal carrier, and for this it is fixed on the seal carrier. After the mounting of the seal carrier on the barrel door 8, it is removed for the operation of the barrel door. For the removal of the seal carrier, the handle 31 is again fixed to the latter.

Advantageously, the seal carrier 24 is made from stainless steel by casting, and the groove 25 wherein is injected the material of the seal, is machine tooled.

The seal is advantageously made from an intumescent material, which has the property of inflating when heated thus providing a tight seal for hot and flammable gases. Advantageously, it also provides heat insulation. For example the material of the seal can be chosen in order to provide its sealing function for more than 2 hours.

The seal is for example made from bi-component mastic, such as a 335s of the Mécatiss® brand. The groove can have any other form that retains the seal in the groove, for example a trapezium form, with the large base corresponding to the bottom of the groove 25.

Figure 2:
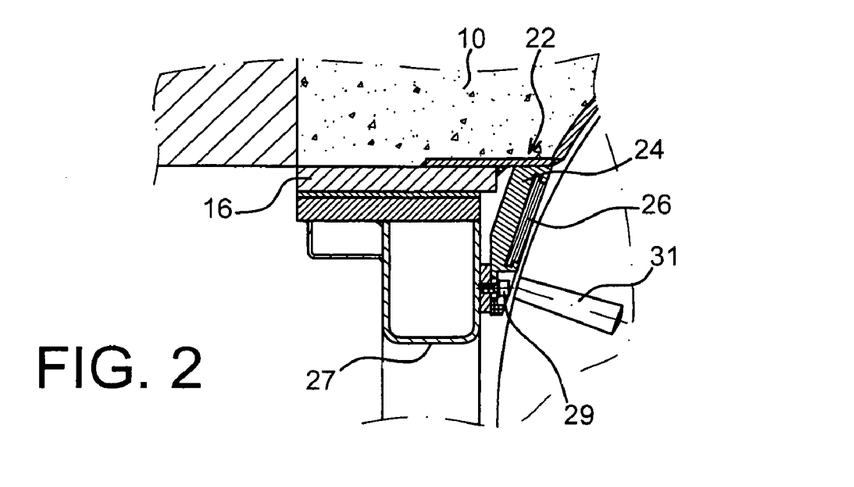
FIG. 2 is a longitudinal cross-section according to the plane A-A of the transfer device according to FIG. 1 wherein the door has been removed.

The seal carrier 24 is fixed to the wall 10 in a removable way, for example by screw-bolt connection. Bolts 29 are for example welded on the shielding 16 (FIG. 2) wherein the seal carrier can be fixed using nuts. Any other means of removable fixation can be used to attach the seal carrier 24 to the wall 10.

In the example shown, the seal carrier 24 is made from several pieces which are placed end to end in order to form the seal between the wall 10 and the barrel door 8 across the entire height of the barrel door 8.

Figure 6A:
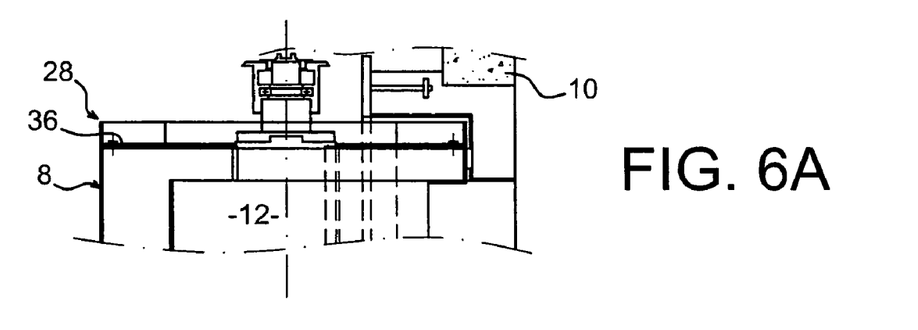
FIG. 6A is a cross-section of an upper portion of the transfer device in FIG. 1.
Figure 6B:
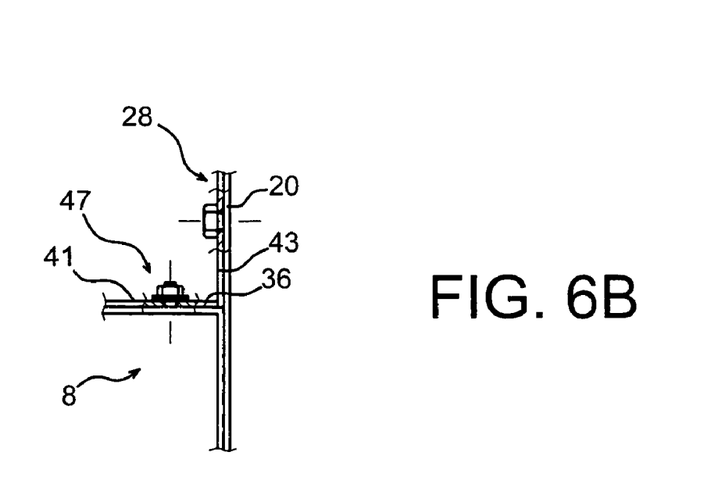
FIG. 6B is a detailed cross-section of FIG. 6A.

The transfer device 6 according to the invention comprises also, advantageously, a first means 28 shown in FIGS. 6A and 6B, able to provoke a pressure drop for hot gases. This first means 28 is positioned at an upper end of the barrel door 8.

This means 28 is carried out in the form of an angle assembly or annular ring. The ring 28 as a cross-section in FIG. 6B, comprises a first 41 and a second 43 sides substantially at a right angle, the first side 41 being flush with an upper surface 36 of the drum 8 and the second side 43 being in line with the outer periphery of the drum 8, thus extending towards the top of drum 8.

The angle assembly 28 is for example made of steel, comprising several arcs of a circle, for example six, placed end to end via welding. The arcs of a circle have an inner radius substantially equal to that of the barrel door. These sectors are advantageously non-jointed.

The angle assembly 28 is, for example, fixed by its first side 41 on the barrel door 8 by a welded pin, washer and nut assembly 47.

Advantageously, means (not shown) to adjust the position of the angle assembly can be provided on the angle assembly 28. The latter make it possible to fix a defined spacing between the recess 20 and the second side 43 of the angle assembly 28. These means of adjustment are advantageously removable and are mounted on the angle assembly 28 only for its positioning.

The angle assembly 28 forms a baffle system, which makes it possible to substantially improve the seal by creating a pressure drop for hot gases. Furthermore, the addition of this angle assembly 28 on the barrel door 8 increases the total height of the barrel door, lengthening the travel of the hot gases to emerge on the upper side of the barrel door 8.

The device according to the invention also comprises, more preferably, a second pressure drop means 30, positioned substantially along a generatrix of the cylindrical body 9, between the wall 10 and a safety caisson 32.

The safety caisson 32 comprises a recess 34 of substantially curved form, with inner radius substantially equal to the outer radius of the barrel door 8 and defining with the recess 20 of the wall 10, a housing extending substantially at 180° around the barrel door 8.

The caisson 32 avoids communication between chambers 2 and 4 during the rotation of the door 8 by providing a minimum overlap between the opening 14 of the door 8 and the caisson 32. As such it avoids the propagation of the fire during the rotation of the door. The caisson 32 is for example formed of a stainless steel jacket filled with MP2 as mentioned previously.

Figure 5:
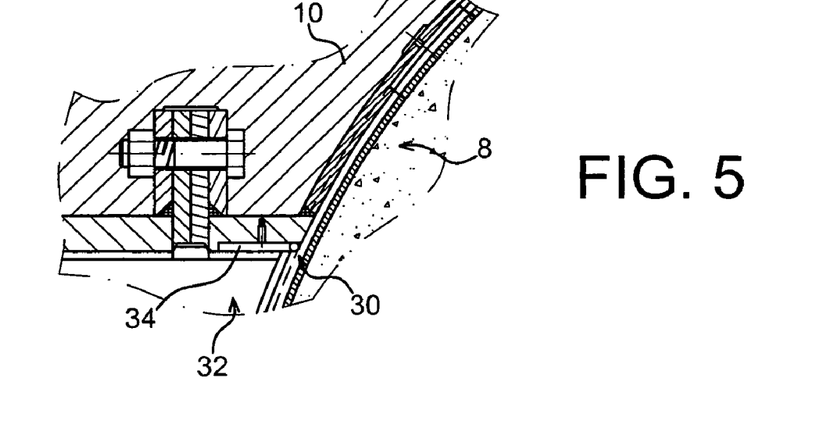
FIG. 5 is another enlarged detailed view of FIG. 1.

The second pressure drop means 30, shown in FIG. 5, is disposed between the safety caisson 32 and the wall 10. In the example shown, the second pressure drop means 30 is formed of an elongated element, for example made of steel and of circular transversal section, of the round steel type, welded in a groove 34 arranged between the wall 10 and the caisson 32.

Advantageously, the second means 30 is made of several sections, for example two, advantageously welded in a housing defined between the shielding covering the wall 10 and the caisson 32, for example via intermittent point weld.

In the example shown, the upper and lower ends of the round steel (not shown) are folded to 90° towards the wall by moving the barrel door away, which makes it possible to remove the spacing of the emerging groove 34.

The round steel is adjusted so as to guarantee a maximum spacing, for example of about 2 mm, with the outer periphery of the door. This makes it possible to obtain a pressure drop sufficient to limit a propagation of hot gases.

Figure 10:
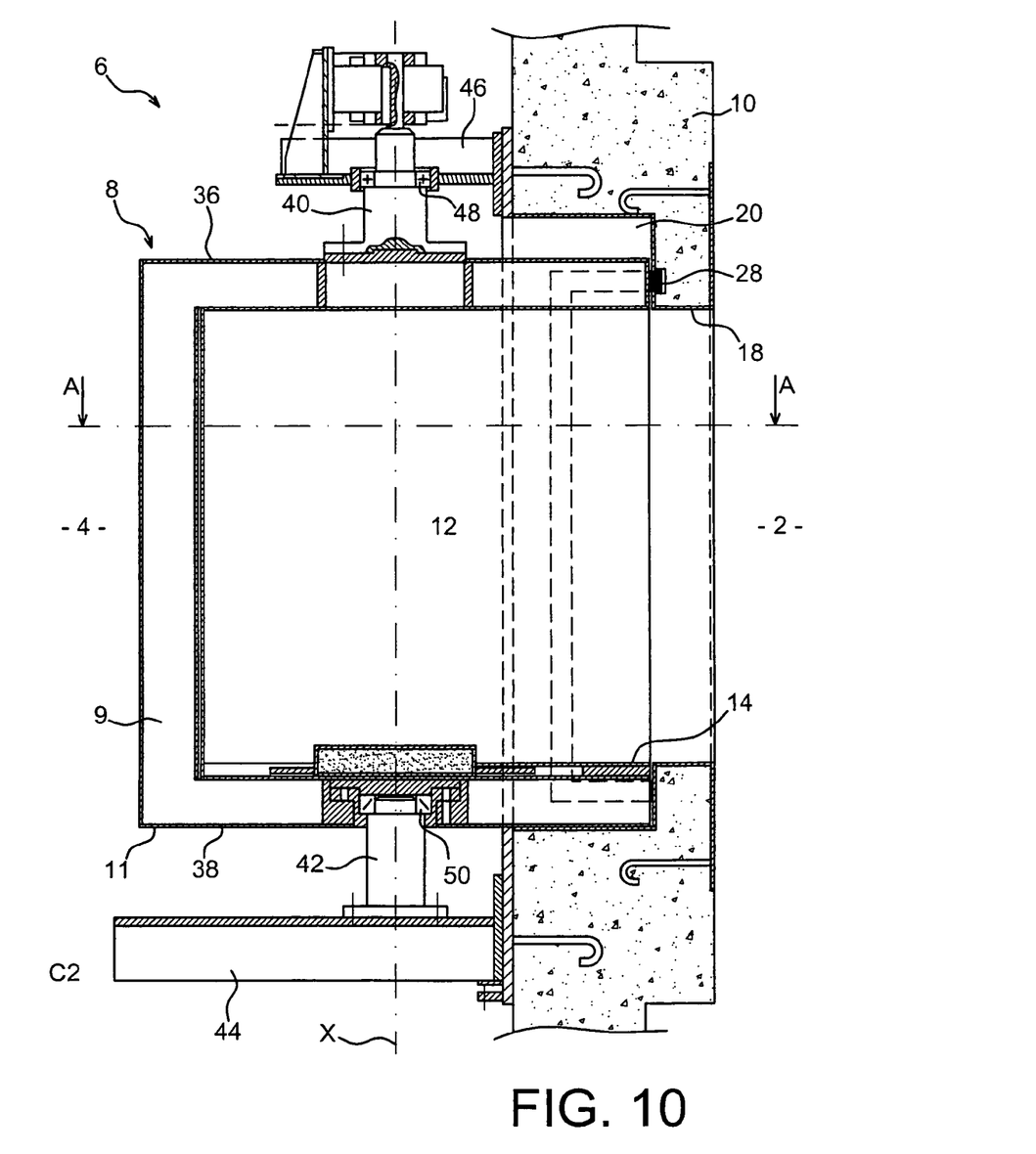
FIG. 10 is a schematic longitudinal cross-section of a device according to this invention.

In FIG. 10, a door 8 can be seen for a transfer device according to this invention, comprising a first upper surface 36 and a second lower surface 38, and first 40 and second 42 axes respectively projecting from surfaces 36 and 38, arranged according to the direction X and forming the axis of rotation of the door 8.

In the example shown, the arms are maintained axially in relation to the wall 10 using a lower support 44 projecting transversally from the wall in the secondary chamber 2 and an upper support 46 also projecting transversally from the wall 10.

The first axis 40 is fixed in rotation in relation to the door and mobile in rotation in relation to the upper support 46 by means of a bearing 48. The second axis is, in the example shown, fixed in rotation on the lower support 44 and mobile by means of a bearing 50 in relation to the door 8.

The door is driven in rotation by an electric motor positioned at one end of the axis 40. The motor can be controlled from the exterior of the installation.

The motor can also be positioned on the second axis 42. Several motors can also be provided.

The operation of said transfer device shall now be explained.

In FIG. 1, the drum can be seen, especially the inner space 12 open onto the main chamber 2. In this position, an object for example a bottle (not shown) containing one or several materials in order to produce nuclear fuel is introduced into space 12. The barrel door 8 is then driven in rotation around the X axis. After having completed a 180° rotation, the interior volume 12 is open onto the secondary chamber 4. The bottle contained in space 12 can thus be transferred into the secondary chamber 4.

The transfer device can also be provided so that the rotation in one direction of the barrel door is less than 180°.

Figure 7:
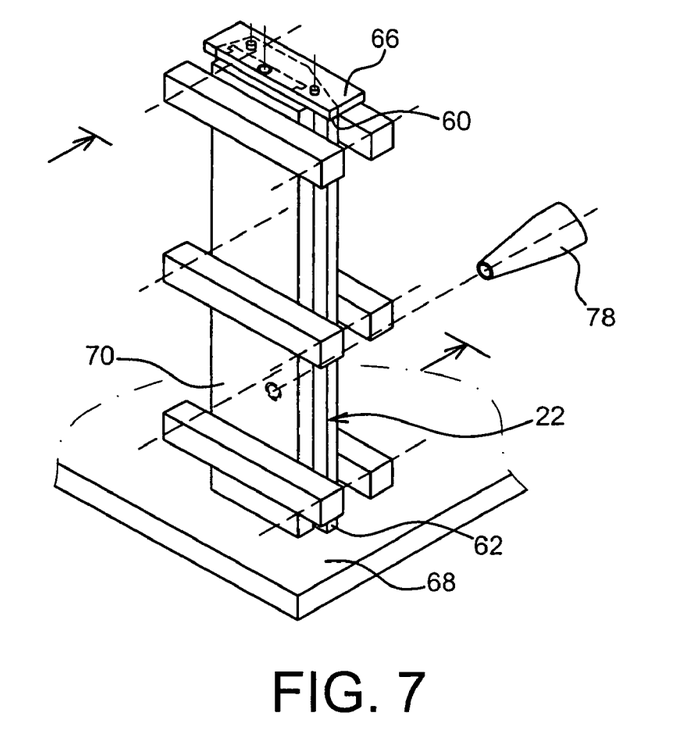
FIG. 7 is a perspective view of a production device of a seal/seal carrier unit according to this invention.
Figure 8:
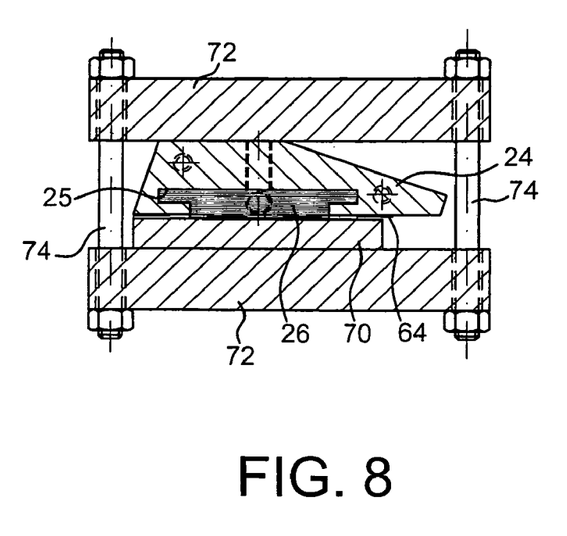
FIG. 8 is a transversal cross-section of FIG. 7.

We shall now describe a method of producing the seal and seal carrier unit according to this invention, in relation to FIGS. 7 and 8.

Such a method comprises the following steps:
installing shutters on the longitudinal and transversal ends of the groove (25) of the seal carrier,
injecting a flame- and hot gas-resistant material into the groove,
removing shutters.

In the FIGS. 7 and 8, the step of injecting the material forming the seal in the seal carrier can be seen.

In order to carry out the injection, the longitudinal ends 60, 62 of the groove, as well as its open end 64 are shut by plates 66, 68, 70 respectively, in such a way as to define the location and the form of the seal 26.

The plates 66, 68 are maintained attached to the seal carrier, for example by screwing on the ends of the seal carrier. The plate 70 is, in the example shown, maintained by tightening between transversal elements 72 connected by the tightening elements 74, such as threaded rods and nuts.

An orifice 76 is provided in plate 70 for the injection of the material of the seal via a nozzle 78 in the groove 25.

When the material has the desired texture, the plates 66, 68 and 70 are removed. The seal carrier provided with the seal is ready to be mounted.

At the transversal end 64 of the groove 25, a knitted sheet of Kevlar® and a sheet of Milard® can be provided in order to provide the seal of the mould when the material is injected. The latter are removed during demoulding.

The invention claimed is:

1. Transfer device for a nuclear installation between a first chamber and a second chamber separated by a wall comprising a curved surface comprising:
   a barrel door comprising a cylindrical body and having an outer periphery, the cylindrical body defining an inner space, the inner space accessible by an opening that is oriented on a side of the first chamber or on a side of the second chamber, the inner space configured to receive materials to produce nuclear fuel, the barrel door movable around an axis;
   at least one sealing means in contact with the curved surface of the wall and the outer periphery of the barrel door to form a seal between the wall and the outer periphery of the barrel door, the at least one sealing means comprising:
   a seal carrier; and
   a seal attached to the seal carrier;
   wherein the seal carrier is removably fixed on the wall, and wherein the seal is in contact with the outer periphery of the barrel door.

2. Device set forth in claim 1, wherein the seal carrier comprises a T groove receiving the seal.

3. Device set forth in claim 1, wherein the seal carrier is made of stainless steel.

4. Device as set forth in claim 1, wherein the seal is made of a material that is resistant to flames and hot gas.

5. Device as claimed in claim 4, wherein the seal is made of intumescent material.

6. Device as set forth in claim 1, wherein the sealing carrier is made of several parts.

7. Device as set forth in claim 1, comprising a first pressure drop means able to increase travel of gases between the chambers, said first means being mounted on an upper end of the door, substantially in a plane orthogonal to the axis of rotation of the door.

8. Device as claimed claim 7, wherein the first pressure drop means is formed by a steel angle assembly.

9. Device set forth in claim 7, wherein the first pressure drop means is formed by several arcs of a circle placed end to end.

10. Device as set forth in claim 1, comprising a second pressure drop means, positioned along a generatrix of the outer periphery of the transfer mechanism.

11. Device as claimed in claim 10, wherein the second pressure drop means comprises an elongated element made of steel, with a substantially circular transversal section.

12. Device as set forth in claim 1, wherein the door comprises a first axis projecting from a first side and a second axis projecting from a second side, around which the door is able to rotate.

13. Device as set forth in claim 1, wherein the door is driven in rotation using at least one electric motor.

14. Device set forth in claim 1, wherein the at least one sealing means is configured to confine flames and hot gas in the first chamber for a determined length of time to prevent passage of the flames and hot gas into the second chamber.

15. Device set forth in claim 4, wherein the material is resistant to hot gases that are at least the temperature of the flames.

\* \* \* \* \*